2,835,761

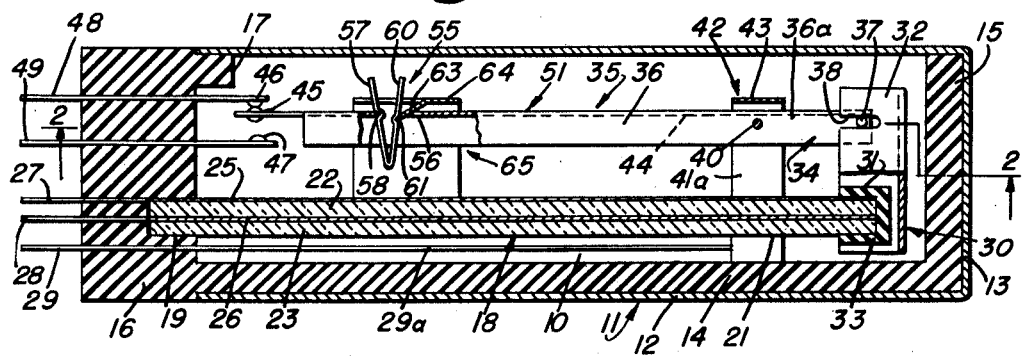
Fig. 1.
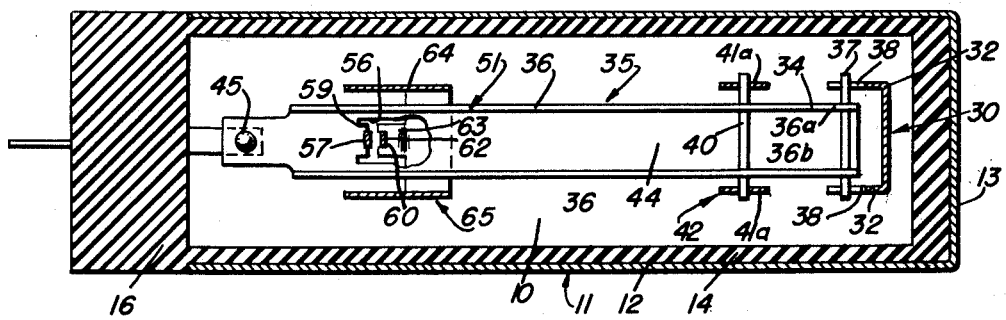
Fig. 2.
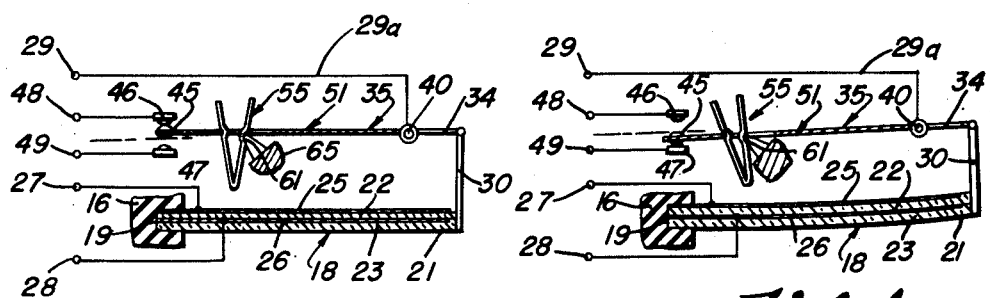
Fig. 3.    Fig. 4.
INVENTOR.
JOSEPH W. CROWNOVER
BY
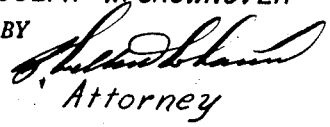
Attorney May 20, 1958  J. W. CROWNOVER  2,835,761
ELECTROSTRICTIVE CERAMIC ACTUATOR
Filed April 1, 1955  2 Sheets-Sheet 2
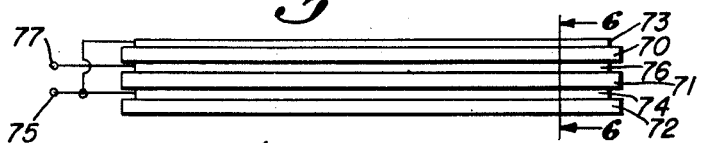
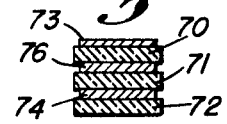
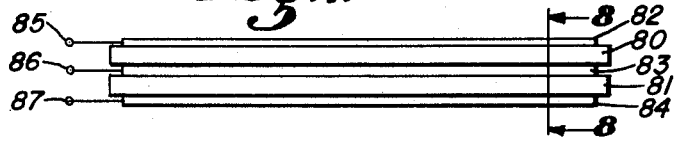
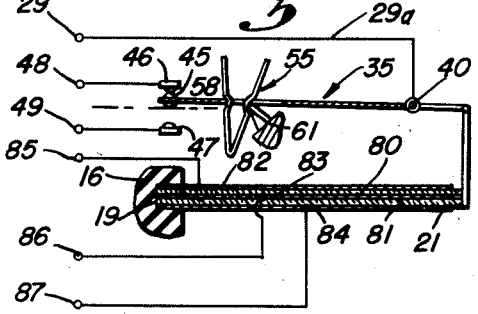
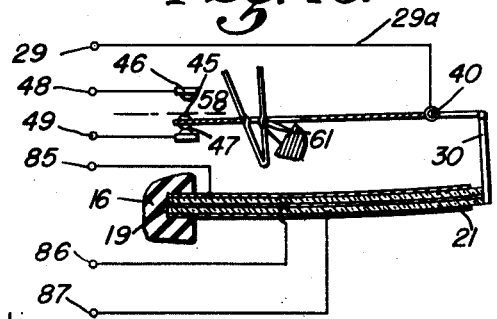
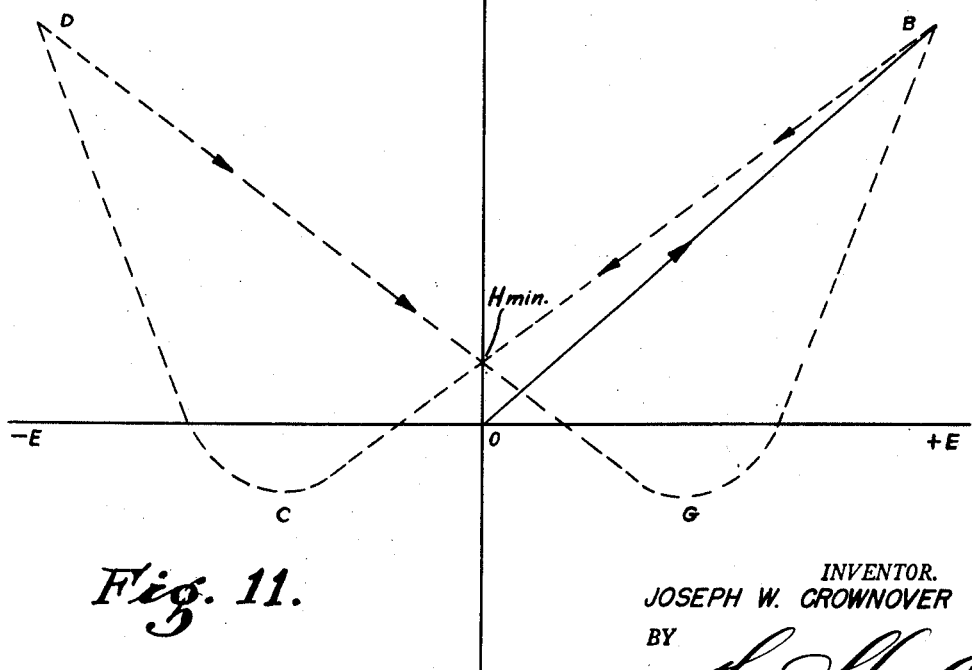
Fig. 11.
INVENTOR.
JOSEPH W. CROWNOVER
BY
Attorney United States Patent Office 2,835,761
Patented May 20, 1958

ELECTROSTRICTIVE CERAMIC ACTUATOR

Joseph W. Crownover, Sherman Oaks, Calif., assignor to Electric Machinery Mfg. Company, Minneapolis, Minn., a corporation of Minnesota Application April 1, 1955, Serial No. 498,473

13 Claims. (Cl. 200—87)

This invention relates to electrostrictive ceramic actuator elements which are adapted for use in various types of transducers such as relays, motors, loudspeakers, etc. The sizable electrostrictive properties of high dielectric ceramic materials such as barium titanate have made possible the practical design of many new types of electrostrictive transducers. This invention is concerned with the utilization of the electrostrictive properties of these high dielectric materials, and particularly it is concerned with the development and utilization of more particular ceramic materials in which the electrostrictive property has been enhanced and the piezoelectric property has been rendered insignificant or negligible, as will be explained in more detail below. In particular, the invention is concerned with ceramic materials and their utilizations in transducers when the material is such that it retains negligent or insufficient polarization charge. The significance of this is that if polarization of the ceramic may be increased and retained, it may also be decreased with the result that the ceramic as an actuator is unstable and is not practical for use in many types of transducers, particularly relays.

Electrostriction, in the broadest sense of dielectrics, pertains to an inter-relationship between an electric field and the deformation of the dielectric in that field. Although this includes the piezoelectric phenomenon, most authorities, in order to avoid confusion, reserve the term "electrostrictive" for the effect that the deformation of the dielectric material subjected to an electrostatic field is proportional to the square of the impressed electric field thereby being independent of the applied fields' polarity. The distinction is explained in the volume by Cady, Piezoelectricity (McGraw-Hill Book Company, 1946). Where the polarization charge is not being depended on for the deforming and actuating effect, the device is not subject to any instability due to lack of control of the remaining polarization charge.

The early dielectrics possessed practically no electrostrictive properties. However, as developments have progressed, dielectrics have been produced with dielectric constants of 100, 1,000 and as high as 10,000, compared to air. The development of these high dielectric materials, particularly ceramic materials, has made possible the design of many new types of devices, as pointed out above. The utilization of the ceramic materials of this invention, particularly the improved materials in which the electrostrictive effect has been greatly enhanced and the tendency of the material to retain polarization charges reduced to a minimum, has made possible many practical transducers which were not heretofore possible. These materials are particularly adaptable for use in relays in which the actuating element appears as a capacitor element and is operative in response to single voltage pulse of either polarity. Various forms of barium titanate ceramics with high dielectric constants provide a very large dimensional change when subjected to electrostatic fields, and this dimensional change results from the electrostrictive properties of the material, and this is particularly true in the special ceramic materials of this invention. These particular materials are materials such as barium titanate including an additive as an impurity which shifts the Curie point to a point near room temperature, say 70° F. The material is operated or worked near this temperature. Any remanent polarization charge is negligible.

As pointed out, when the materials of this invention are utilized in a relay as one form of transducer, the actual element is in the form of a capacitor having very high leakage resistance. The unit operates in response to a voltage pulse and the power requirements are negligible or insignificant. The relay, utilizing the ceramic materials may be operated with moderate potential supplies over extremely high impedance circuits which impedance may be in the order or megohms. The relay is adapted to many and varied applications, as, for example, it is ideally adapted for use in remote control applications where the control line may be long, high resistance circuits.

In accordance with the foregoing, it is an object of the invention to utilize the electrostrictive properties of ceramic materials such as barium titanate.

It is another object of the invention to provide improved electrostrictive ceramics wherein the property of the ceramics to retain polarization charge is negligible or insignificant.

Another object of the invention is to provide ceramics as in the foregoing object having a relatively low Curie point, that is, in the neighborhood of room temperature, say 70° F.

Another object of the invention is to provide a transducer element comprising an electrostrictive ceramic, the material of the ceramic having the property that it retains only a negligible polarization charge as a result of the application of voltage to the element for actuation.

Another object of the invention is to provide a transducer element comprising a ceramic composition including barium titanate and modifying additives whereby the remanent polarization charge of the material is minimized.

Another object of the invention is to provide an electrical actuator comprising a ceramic material having electrostrictive properties having electrodes on the opposite surfaces thereof which is adapted to deform in the same sense irrespective of the voltage applied thereto.

Another object of the invention is to provide ceramic material having pronounced electrostrictive properties and having the property of retaining negligible polarization charge, the materials comprising barium titanate and strontium titanate in appropriate proportions.

Another object of the invention is to provide ceramic materials as in the foregoing wherein the materials comprise barium titanate and calcium stannate in appropriate proportions.

Another object of the invention is to provide an electrical relay utilizing ceramic materials as referred to in the foregoing.

Another object of the invention is to provide a novel electrostrictive transducer actuated relay in which means is provided for obtaining relatively great movement of a movable electrical contact member in response to an applied voltage, and for securing firm pressural contact or engagement between the electrical contact and a fixed electrical contact.

Another object of the invention is to provide a novel electrostrictive transducer actuated relay in which displacement of the movable electrical contact is related to the mechanical properties of the transducer unit in such a way that the engagement of the electrical contacts is effected, at least in part, by forces arising from the mechanical stiffness of the transducer unit itself.

A further object is to provide a novel electrostrictive transducer actuated relay in which displacement of the relay actuating member is not dependent upon the polarity of the relay actuating voltage and will be in the same direction or sense irrespective of the polarity of the applied voltage.

Another object is to provide a novel electrostrictive transducer actuated relay which is not dependent in its action upon remanent polarization of the electrostrictive material, which may be operated by a single voltage pulse, and which does not require the expenditure of power to maintain the electrical contacts in engagement after the initial application of voltage.

A further object is to provide in a relay a novel arrangement of the essential relay components to compensate for acceleration or deceleration of these components as during shock loading of the relay so that engagement of the movable electrical contact member with the fixed electrical contact member will not be caused by such shock loading.

A still further object of the invention is to incorporate in the relay a novel combination of electrostrictive transducer components arranged in such a way as to convert expansive motion of the electrostrictive elements in response to applied electrical potential into bending motion characterized by relatively large bending displacements. This application is a continuation-in-part of my earlier filed application Serial No. 357,132, filed May 25, 1953, and now abandoned.

Further objects and numerous advantages of the invention all become apparent from the following detailed description and annexed drawings wherein:

Fig. 1 is a cross-section view of a relay unit illustrative of the present invention;

Fig. 2 is a cross-sectional view taken on line 2—2 of Fig. 1;

Fig. 3 is a schematic view of the relay unit of Fig. 1 illustrating the position of the relay components before actuation thereof;

Fig. 4 is another schematic view of the relay unit of Fig. 1 illustrating the position of the relay components after actuation thereof;

Fig. 5 is a side elevational view of another form of bending transducer unit which may be used in the relay unit of the present invention;

Fig. 6 is a cross-sectional view taken on line 6—6 of Fig. 5;

Fig. 7 is a side elevational view of another form of bending transducer unit which may be used in a so-called polarized relay unit;

Fig. 8 is a cross-sectional view taken on line 8—8 of Fig. 7;

Fig. 9 is a schematic view of a so-called polarized relay unit illustrating one position of the relay components;

Fig. 10 is another schematic view of a polarized relay unit illustrating another position of the relay components; and Fig. 11 is a diagrammatic view of the response of an electrostrictive element to applied voltage.

One of the ceramic materials which has a high dielectric constant and which exhibits a significant electrostrictive effect comprises a polycrystalline aggregate such as a titanate ceramic. A titanate ceramic having suitable transducing qualities is an aggregate comprising crystals of barium titanate and additive of strontium titanate bonded together with binder in a manner known in the art. The additive constitutes an impurity. When subjected to electrostatic fields, this material is capable of developing mechanical strain by virtue of its inherent electrostrictive properties. A transducer element of this material responds to an applied electrostatic field by expanding in the direction of the field and contracting in a plane transverse to the direction of the field.

As has been explained in the foregoing, ceramic materials having higher and higher dielectric constants have been developed and by this invention the inherent electrostrictive properties of these materials have been utilized. This invention, however, involves the additional development of these materials to the point where the electrostrictive property is more thoroughly pronounced and the tendencies of the materials to retain polarization charge is rendered insignificant or negligible. The development of the presently highly successful electrostrictive ceramics has continued over a period in which increasing success has been achieved by the combining with relatively pure barium titanate certain small additives, to minimize the remanent polarization. The effect of the additives is to shift the Curie point to a relatively low value at or near room temperature, the material remaining electrostrictive. Thus at the normal operating temperature any remanent polarization charge is negligible. Prior art piezoelectric materials are known to lose their polarization charge when heated above the Curie point. At the outset, it may be stated that the objective has been to isolate and enhance the electrostrictive property of the materials and to render the remaining polarization charge effect negligible. That is to explain the meaning of this, it means that the objective has been to cause the ceramic materials to have such character that when subjected to voltages for purposes of actuation, the material would not retain any significant polarization. As a result of the process of development, as pointed out, successful electrostrictive ceramic materials were developed and successful composition of these are indicated in the following examples:

*Composition 1*

BaTiO$_3$ ---------------------------- 610 grams, 61%
SrTiO$_3$ ---------------------------- 390 grams, 39%
Resinous or plastic binder.

*Composition 2*

| | Parts |
|---|---|
| BaTiO$_3$ | 500 |
| CaSnO$_3$ | 15 |

Resinous or plastic binder.

In the foregoing examples, the materials other than the barium titanate, the strontium titanate and calcium stannate ceramics, are materials constituting a resin or binder utilized to bind together the comminuted ceramics. The preparation of the ceramics having the foregoing compositions may be in accordance with prior art teachings or it may be in accordance with the process of my earlier application, Serial Number 425,664, filed April 26, 1954. In general, the ceramics are formed in very thin sheets of uniform thickness with the ceramic particles dispersed through a body of polymerized thermoplastic resin, the ware being adapted to be baked at elevated temperatures to produce high quality ceramic sheets. These resins may be melamine-formaldehyde resins, for example. The material is originally in the form of a relatively thick viscous liquid mixture from which the resins are baked out in the process.

As an example of the experimental preparation of one of the compositions listed above, the resin was weighed out in a beaker and its solvent which may be a low molecular weight alcohol then weighed in the same beaker. The combination was then placed on a hot plate and solution occurred neatly and quickly with no complications. The comminuted ceramics were next added and the material was formed into a thin sheet and baked to burn out the resins leaving a sintered ceramic sheet.

The ceramic materials having compositions as in the foregoing were formed into thin sheets and for purposes of relay applications the sheets may be cut into strips of suitable widths and lengths to be used as actuators. To illustrate the electrostrictive effect, if such a strip has an electrode applied to its opposite faces, as will be described, the application of voltage between the electrodes will result in an expansion of the material in the direction between the electrodes and a constriction or contraction in the other dimensions. The effect is substantially quadratic, as indicated in the graph, Figure 11 of the drawings. Referring to Fig. 11, this figure shows a plot of the thickness dimensional changes of a strip of ceramic as produced in the foregoing as a function of applied potential. It will be understood that this graph has reference to a ceramic produced as in the foregoing which is uncharged, that is which possesses and/or retains only a negligible remanent polarization charge. The ordinates of the curve of this graph are H, the thickness displacement of the beam or strip of ceramic and the abscissas are E, the applied voltages. The resulting electrostatic field is directly proportional to E. Initially, H is zero at zero field. With the subsequent application of a small electric field, the curve of Figure 11 is traced from zero to B as shown by the solid line. Upon removal of the field, the displacement does not return to zero but the strip retains a small remanent displacement H min.

A reversal of E will cause the displacement to go to zero and with a higher reverse potential slightly farther to maximum negative position C. Then with increasing negative values of E, the displacement will move to D in Figure 11. Removal of the field will cause the displacement H to again increase to H min. Upon further applications and reversals of E, the curve will trace from B to C to D to G and back to B, thus forming a complete cycle.

The curve is substantially quadratic in effect. It is therefore, by the previously stated definition of electrostriction representative of the actual electrostrictive phenomenon.

Referring now to Figs. 1, 2, 3 and 4 of the drawings, there is represented in these drawings, by way of an example, a relay utilizing principles outlined in the foregoing. This relay is merely exemplary of one form of transducer which may use the ceramics of this invention. Referring now to the relay unit illustrated in Fig. 1, the movable relay components are positioned within a chamber formed inside an elongated housing 11 which comprises a thin walled metallic tube 12, closed at one end 13 and a thick walled insulating tube 14, closed at its outer end by wall 15 and at its other end by face wall 16. The tube 14 has a cutaway portion 17 along one side thereof which facilitates mounting of the relay component within the chamber 10.

An elongated transducer unit 18 is mounted as a cantilevered member within the chamber 10, having one end 19 thereof mounted in the end wall 16 of tube 14, so that the transducer unit extends lengthwise in chamber 10 with its free end 21 lying near the outer end wall or portion 15 of tube 14. The transducer unit illustrated includes a thin elongated electrostrictive member or wafer 22 which is joined to a thin elongated reaction member 23, as by cement. Reaction member 23, preferably comprises the same electrostrictive material as member 22, so that both members will have the same coefficient of thermal expansion and will then be thermally stable, contracting and expanding with temperature changes in equal increments.

The elongated electrostrictive member 22 has electrodes 25 and 26 formed on its opposite surfaces or faces, as by applying silver paint to these faces. The electroded surfaces 25 and 26 are electrically connected respectively to terminals or prongs 27 and 28, projecting outwardly from the face 16 of the tube 14. The electrical connections provide means for establishing a potential difference between surfaces 25 and 26 to establish an electrostatic field across the thickness dimension of the electrostrictive member 22. When such a field is established, the electrostrictive body 22 will expand in its thickness mode and contract in its length mode causing shortening or contraction of the elongated body. Shortening of body 22 will be resisted by the reaction member 23 and opposing moments of force will be set up in the two bodies, 22 and 23, causing bending of the transducer unit in an upward direction, as viewed in Fig. 1; that is, bending will occur toward that side of the transducer unit along which extends the electroded electrostrictive member having the electrostatic field applied thereto.

Joined to the free end 21 of the transducer unit 18 is a link 30, which projects laterally therefrom. As shown in Figs. 1 and 2, the link member comprises a channel member having slots 31 formed in the side walls 32 thereof. The slotted walls 32 are joined to the free end 21 of the transducer unit by means of a hardened insulating material 33 such as a non-conducting thermo-setting resin. The link 30 forms a means for connecting the free end of the transducer unit to one end 34 of swingable arm 35. The latter is an electrically conductive channel member having side walls 36. A pin 37 extends through opposite side walls 36a and 36b at the end 34 of arm 35 so as to engage oppositely disposed slots 38 in the walls 32 of link 30.

Arm 35, which extends substantially parallel to transducer unit 18, is mounted to swing about a pivot which comprises a pin 40 passing through opposite side walls 36a and 36b of the arm to engage opposite legs 41a and 41b of an electrically conductive supporting bracket 42. The legs of bracket 42 are supported by the walls of tube 14, and the cross piece 43 of the bracket extends over the rib section 44 of arm 35. Leg 41a is joined to external terminal 29 by conducting member 29a.

The leftward end of arm 35 has attached thereto an electrical contact 45 which is capable of being swung in an arc about pivot pin 37 between a pair of fixed electrical contacts 46 and 47. The latter are joined to external terminals 48 and 49 projecting outwardly from the base end 16 of tube 14. It will be seen that when the free end 21 of the transducer unit moves upwardly (Fig. 1) during bending of the transducer unit, the connecting link 30 will force the end 34 of arm 35 upwardly causing electrical contact member 45 to be moved downwardly toward the fixed contact member 47. The pivot pin 40 is positioned closer to the connecting link 30 than to the electrical contact 45 so as to define a first arm portion 34 between pins 40 and 37 which is shorter than second arm portion 51 between pin 40 and contact 45. Thus, the displacement of the free end 21 of the transducer unit 18 bringing about the movement of the contact 45 will be magnified at the contact 45 in the ratio that the length of the second arm portion bears to the first arm portion, thereby permitting the fixed electrical contacts 46 and 47 to be advantageously spaced farther apart to eliminate arcing and other undesirable effects. It will also be noted that arm 35, connecting link 30, and transducer unit 18 are arranged and disposed to co-act in such a way that the moment of inertia of the second arm portion 51 about the pivot pin 40 is substantially balanced by the counteracting moments of inertia of the combination of the first arm portion 34, connecting link 30, and transducer unit 18 about the same pivot pin. Thus when the relay unit is being utilized on an accelerating body, the engagement of the electrical contact 45 with either of the fixed contacts 46 and 47 will not be disturbed.

An over-center spring in the form of a U-shaped member 55 is mounted between pivot 40 and contact 45 to bias the second arm portion 51 toward either one of the fixed electrical contacts 46 and 47. Spring 55 extends substantially normal to arm 35 through an aperture 56 in the web section 44 of the arm. One leg 57 of the spring seats at a pivot point 58 within a saddle 59 formed in the web 44 of arm 35, and the other leg 60 seats at a pivot point 61 in a saddle 62 formed in a finger or pivot member 63 which projects downwardly from the cross piece 64 of a bracket 65, which is fastened to the tube 14.

The action of the spring member 55 is better illustrated in Figs. 3 and 4 which schematically represent the relay action. When the transducer unit is not electrically energized, the movable electrical contact 45 is biased toward the fixed contact 46 by the spring 55 as shown in Fig. 3. The leg 57 of the spring exerts a force on the second arm portion 51, and the vertical component of this force is utilized to bring about firm engagement between electrical contacts 45 and 46. When the transducer unit is electrically energized, as shown in Fig. 4, the free end of the unit 18 moves upwardly causing the second arm portion 51 of the arm 35 to pivot counter-clockwise or downwardly toward the lower fixed contact 47. As arm portion 51 pivots downwardly, the two legs of the spring are brought closer together, and when the pivot point 58 between the leg 57 and the saddle 58 of web section 44 is brought into alignment with a line through pivot points 40 and 61, the force component exerted by the spring tending to move the arm portion 51 upwardly or downwardly becomes equal to zero. At this point, the two legs of the spring are at their closest point. As arm portion 51 continues to pivot downwardly, the two spring legs are permitted to move apart, giving rise to a vertical force component urging the movable contact 45 toward fixed contact 47.

It will be noted that transducer unit 18 serves to move the movable contact 45 between a point adjacent fixed contact 46 and a point adjacent fixed contact 47, and the spring 55 is relied on to exert sufficient force to bring the movable contact 45 into firm pressural engagement with either of the contacts 46 or 47. Thus the forces exerted by the transducer unit 18 need not be expended in forcing the contacts together, but need only be used in moving the movable contact 45 between the fixed contacts to be spaced a maximum distance. The over-center spring is arranged so that its centered position corresponds to the mid-position of movable contact 45 between fixed contacts 46 and 47, and the spring will therefore tend to urge the movable contact toward either of the fixed contacts 46 or 47 according to whether the second arm portion 51 is closer to one or the other of these contacts.

The spring force component urging the movable contact 45 toward the upper fixed contact 46 is less than the force component arising from the transducer bending action tending to move the contact 45 toward the lower fixed contact 45, so that when the transducer is energized, the movable contact 45 will move off fixed contact 46 and move toward fixed contact 47. The movable contact 45 will tend to snap toward the lower fixed contact 47, since the spring force component resisting this movement will diminish rapidly to zero at the halfway point and then will aid the movement of the contact 45 during the remainder of its motion. As long as the transducer unit remains energized the movable contact 45 will remain in firm engagement with contact 47. It will be especially noted that no energy is expanded in the transducer unit in holding movable contact in engagement with fixed contact 47, since the transducer unit remains in its displaced position by virtue of the application of voltage alone, and the only current being drawn by the transducer unit is that represented by losses due to leakage, which are negligible.

When voltage is removed from the transducer unit, the forces arising from the bending elasticity of the elongated members 22 and 23 will overbalance the component of force of the spring, to result in a net force tending to move the movable contact 45 back toward the upper fixed contacts 46. Movable contact 45 will snap back toward contact 46 because the spring force opposing this motion will rapidly diminish to zero at the mid-point between contacts 46 and 47 and will then aid the motion of the movable contact 45 during the balance of its return to engage contact 46.

It will be understood that the electrostrictive member 22 is worked at a voltage which is near maximum short of dielectric breakdown for the material used in order to obtain maximum displacement of the material and resultant maximum bending of the transducer unit. For barium titanate or the other ceramic materials disclosed in the foregoing, the voltage gradient utilized may be in the neighborhood of 40 volts per mil thickness of the material. The operating voltage is sufficient to overcome any remanent polarization effects visible on the graph, Fig. 11. If the polarization effects were not minimized, as explained, the voltage would not overcome them. For example, with pure barium titanate it would require substantial voltage and considerable time to overcome the retained polarization. However, the voltage may vary considerably and with the materials having more pronounced electrostrictive properties, the actuating elements require considerably lower operating voltages. As has been explained remanent polarization effects characteristic of prior art materials of polycrystalline aggregate types are not depended upon nor utilized to achieve the desired mechanical response, and loss of mechanical sensitivity in response to unit applied voltage, as the result of increased operating temperatures, which is encountered when remanent polarization effects are utilized is avoided. The effect of the additives in the foregoing compositions is to shift the Curie point to a relatively low value of approximately room temperature. Thus the remanent polarization effects are negligible at any operating temperature of the unit by reason of the controlled Curie point. It is, of course, known that in prior art piezoelectric ceramics where the polarization charge is depended upon for operation that in these ceramics, if they are heated to a temperature above or approaching the Curie point, there is a proportional loss of the remanent polarization. By reason of this phenomenon, these materials are decidedly not suitable for relay applications. The relay unit of this invention remains fully operative at room temperature and also temperatures in excess of 140° centigrade. It is pointed out again that the relay unit operates irrespective of the polarity of the voltage applied to the electroded surfaces of the electrostrictive material. That is, the unit responds or bends in the same direction irrespective of applied polarity. As a result, the leads 27 and 28 do not require to be marked with a polarity designation. The relay unit has been found to be stable in operation requiring moderate operating voltages and operating at substantially the same voltage irrespective of the ambient temperature.

Another form of bending transducer unit is illustrated in Figures 5 and 6. A pair of electroded electrostrictive strips 70 and 71 similar to those described above are cemented together and a third elongated member 72 coextensive with the pair of strips 70 and 71 is joined to one of the strips such as strip 71. The outer electroded surfaces 73 and 74 of the pair of electrostrictive strips are joined together and connected to terminal 75, so that the surfaces may be electrically charged together. The center electroded surface 76 between the two strips 70 and 71 is electrically connected to terminal 77. Thus, a sandwich type of bender unit is provided wherein two electrostrictive strips may be caused to contract together in a lengthwise direction against the resistance of a reaction member, so as to bring about greater bending force of the transducer unit than would be possible with only one electrostrictive member being used. Increased bending force for a given input voltage is obtained as a result of providing a plurality of thin electrostrictive strips sandwiched together, each of the strips being worked at a voltage gradient near the maximum for the material short of dielectric breakdown.

The transducer unit illustrated in Figs. 7 and 8 comprises a pair of electroded electrostrictive strips 80 and 81 similar to those described in Figs. 5 and 6; however, no reaction member is joined to the strips. Instead each of the electroded surfaces 82, 83 and 84 is connected respectively to a separate terminal indicated at 85, 86 and 87, so that the electroded surfaces on opposite sides of either one of the electrostrictive strips may be charged oppositely while the uncharged strip acts as a reaction member. In this way, the transducer unit may be caused to bend upwardly by applying voltage to the electroded surfaces 82 and 83 or may alternately be caused to bend downwardly by applying voltage to the electroded surfaces 83 and 84. Here again the application of voltage in either case may be voltage of either polarity.

The transducer unit illustrated in Fig. 7 may be utilized to advange in the relay which is schematically illustrated in Figs. 9 and 10. The latter relay is characterized by the fact that the movable contact 45 will remain in engagement with the lower fixed contact 47 when the voltage applied to the transducer unit is removed. This is accomplished by arranging the position of the pivot point 61 for the overcenter spring 55, so that the pivot point 58 will be aligned with pivot points 40 and 71 when the movable contact 45 is closer to the upper fixed contact 46 than to the lower fixed contact 47. The overcenter spring 55 utilized is arranged so that at the upper contact 46 the force component arising from the spring and tending to urge the contact 45 into engagement with the upper contact 46 is less than the force component arising from the transducer bending action bending to move the contact 45 toward the whole or fixed contact 47; while at the lower fixed contact 47 the force component arising from the spring tending to urge the movable contact 45 into engagement with the lower contact 47 is greater than the force component arising from the bending elasticity of the elongated electrostrictive members 80 and 81 when no voltage is applied to the electroded surfaces thereof. To return the movable contact into engagement with the upper fixed contact 46, a voltage pulse of the required magnitude is applied to the electroded surfaces 83 and 84 to establish a voltage gradient across electrostrictive member 81 and the resultant downward bending of the transducer unit will give rise to a force component tending to urge the movable contact toward fixed contact 46 overbalancing the spring force component resisting this motion.

It will be particularly noted that the relay of the latter type is adapted to operate effectively when a voltage pulse of but very short duration is applied to the electroded surfaces of the electrostrictive strips. Thus, the relay will operate when the voltage pulse has a time duration of as little as ten micro-seconds even though the actual physical bending of the transducer unit and the resultant actuation of the relay requires approximately five milli-seconds. In other words, the "stimulation" of the relay to actuation takes place in a time interval which is only a very small fraction of the time interval required to complete the relay action. Therefore, a battery of relays of the type described and illustrated may be "stimulated" to actuation before any of them completes its relay action, a property demonstrating that the relay of the present invention is particularly well adapted for use in certain types of digital computers and apparatus of a similar type.

From the foregoing, those skilled in the art will recognize that I have provided improved electrostrictive ceramic materials suitable for use in transducers of various types, and particularly adapted for use in relays. The invention recognizes and utilizes the electrostrictive properties of high dielectric ceramics and particularly the especial ceramics of this invention wherein the electrostrictive properties are enhanced and the tendency of the material to retain polarization charge is made negligible or insignificant. The materials are adaptable to a wide range of uses and applications. In the particular adaptation to a relay, as disclosed herein, the actuator element appears as a capacitive element having high leakage resistance. The relay, being capacitive, operates from an accumulation of energy or charge rather than from a rate of flow of energy. The relay is accordingly adaptable to use in circuits passing extremely minute currents under appropriate potential pressure. As a result, the invention makes possible many new applications for relays that were heretofore impossible.

The foregoing disclosure is illustrative of preferred forms of my invention. I contemplate that various changes and modifications can be made without departing from the invention, the scope of which is indicated by the claims annexed hereto.

I claim:

1. An improved relay including: a pair of fixed electrical contacts spaced from one another; a swingable arm carrying a movable electrical contact between said fixed contacts; pivot means for said arm; over center spring means for urging said swingable arm toward either of said fixed contacts; a bending transducer unit including an elongated member comprising a polycrystalline electrostrictive material, said member having opposite electroded surfaces, and a reaction member joined to said electrostrictive member, said bending transducer unit having a fixed and a free end; means connecting the free end of said unit to said swingable arm, and means for impressing a relay actuating potential difference between said surfaces.

2. An improved relay including: a pair of fixed electrical contacts spaced from one another; a swingable arm carrying a movable contact between said fixed contacts; pivot means for said arm; a bending transducer unit including an electrostrictive member having opposite electroded surfaces, and a reaction member joined to said electrostrictive member, said bending transducer having a fixed and a free end; means connecting the free end of said transducer unit to said swingable arm; and means for impressing a potential difference between said surfaces.

3. An improved relay including: a pair of fixed electrical contacts spaced from one another; a swingable arm carrying a movable electrical contact between said fixed contacts; pivot means for said arm spaced from said movable contact so as to define a first arm portion; over center spring means for urging said first arm portion towards either of said fixed contacts; a transducer unit including an elongated electrostrictive member deformable in response to applied electrical potential, said transducer unit having a fixed end; and connecting means joining said transducer unit to said swingable arm at a point spaced from said pivot means to define a second arm portion.

4. The combination of claim 3 wherein said second arm portion has a length which is less than the length of said first arm portion, whereby a displacement of said movable contact is greater than the displacement of said connection means.

5. The combination of claim 3 wherein said first arm portion has a moment of inertia about said pivot point which is substantially equal in magnitude to the combined moment of inertia about the pivot point of said second arm portion, connection means and transducer unit.

6. An improved relay including: a pair of fixed electrical contacts spaced from one another; a swingable arm carrying a movable electrical contact between said fixed contacts; pivot means for said arm; over center spring means for urging said swingable arm towards either of said fixed contacts; a bending transducer including at least one pair of elongated members, each comprising a polycrystalline electrostrictive material, each of said members having opposite electroded faces, said members being joined in face to face relation; said bending transducer having a fixed end; means connecting said bending transducer to said swingable arm; and means for impressing an electrical potential between the electroded faces of one or the other of said elongated electrostrictive members.

7. An improved relay including: a fixed electrical contact; a bending transducer including at least one pair of elongated electrostrictive members, each of said members having opposite electroded faces, said members being joined in face to face relation; means for impressing an electrical potential between the electroded faces of one or the other of said elongated electrostrictive members, a movable electrical contact arranged to be moved toward said fixed contact by said bending transducer; and over center spring means for holding said movable electrical contact in engagement with said fixed electrical contact when no electrical potential is applied to said electroded faces.

8. An improved relay, including: a pair of fixed electrical contacts spaced from one another; a swingable arm carrying a movable electrical contact between said fixed contacts; pivot means for said arm; a bending transducer including at least one pair of elongated electrostrictive members, each of said members having opposite electroded faces, said members being joined in face to face relation; means connecting said transducer to said arm; means for impressing electrical potential between the electroded faces of one or the other of said elongated electrostrictive members; and overcenter spring means for holding said movable electrical contact in engagement with at least one of said fixed electrical contacts when no electrical potential is applied to said electroded faces.

9. An improved relay, including: a pair of fixed electrical contacts spaced from one another; a swingable arm bearing a movable electrical contact between said fixed contacts; pivot means for said arm; a bending transducer including at least one pair of elongated electrostrictive members, each of said members having opposite electroded faces, said members being joined in face to face relation; means for impressing an electrical potential between the electroded faces of one or the other of said elongated electrostrictive members, means connecting said transducer to said arm; and spring means for resisting the movement of said movable electrical contact away from either of said fixed electrical contacts when electrical potential is applied between opposite electroded faces of either of said electrostrictive members.

10. A transducer unit comprising a substantially unpolarized barium titanate ceramic element, said element having electrodes on oppositely disposed surfaces thereof, said element being substantially free from the property of retaining an electrical polarization charge, and said element possessing the electrostrictive characteristic that upon the application of voltage of one polarity between the electrodes it deforms in one sense and upon the application of reverse polarity it deforms in the same sense.

11. A transducer unit comprising an element of ceramic material consisting essentially of substantially unpolarized barium titanate, said element having electrodes on oppositely disposed surfaces thereof, a reaction member associated therewith, said material having a minor percentage of impurity therein and being substantially free of retentiveness of electrical polarization charge, and said material possessing electrostrictive characteristics sufficiently that upon the application of voltage between the electrodes of one polarity the unit deforms in one sense sufficiently to actuate electrical contacts and upon the application of reverse polarity it deforms in the same sense sufficiently to actuate the contacts.

12. An improved relay including: a first electrical contact; a swingable arm carrying a movable contact adapted to engage said first contact; a bending transducer unit, including a substantially unpolarized barium titanate ceramic electrostrictive member having opposite electroded surfaces and a reaction member joined to said electrostrictive member, said electrostrictive member being substantially free from the property of retaining an electrical polarization charge and having the electrostrictive property that it deforms in the same sense irrespective of the polarity of the voltage applied between the electroded surfaces, said bending transducer having a fixed and a free end; and means whereby movement of the free end of said transducer unit causes engagement and disengagement of said electrical contacts.

13. An improved relay including: a first electrical contact; a movable member carrying a second contact adapted to engage with said first contact; a bending transducer unit, including a substantially unpolarized barium titanate ceramic electrostrictive member having opposite electroded surfaces and a reaction member joined to said electrostrictive member, said electrostrictive member being substantially free from the property of retaining an electrical polarization charge and having the electrostrictive property that it deforms in the same sense irrespective of the polarity of the voltage applied between said electroded surfaces; means connecting a movable part of said bending transducer to said movable member; and means for impressing a potential difference between said electroded surfaces.

References Cited in the file of this patent

UNITED STATES PATENTS

| | | |
|---|---|---|
| 2,033,631 | Gruetzmacher | Mar. 10, 1936 |
| 2,068,374 | Carlson | Jan. 19, 1937 |
| 2,587,482 | Keller | Feb. 26, 1952 |
| 2,624,853 | Page | Jan. 6, 1953 |
| 2,625,663 | Howatt | Jan. 13, 1953 |
| 2,640,889 | Cherry | June 2, 1953 |
| 2,691,082 | Turner et al. | Oct. 5, 1954 |
| 2,706,326 | Mason | Apr. 19, 1955 |
| 2,714,642 | Kinsley | Aug. 2, 1955 |
| 2,719,929 | Brown | Oct. 4, 1955 |
| 2,756,353 | Samsel | July 24, 1956 |